(12) United States Patent
Westcott et al.

(10) Patent No.: US 10,849,265 B2
(45) Date of Patent: Dec. 1, 2020

(54) MANURE SPREADER IMPROVEMENTS

(71) Applicant: DUTCH BLACKSMITH SHOP LTD., Pilot Butte (CA)

(72) Inventors: Wayne Gordon Westcott, Regina (CA); Adam Jack Joseph Kraine, Regina (CA)

(73) Assignee: Dutch Blacksmith Shop Ltd., Pilot Butte (CA)

( * ) Notice: Subject to any disclaimer, the term of this patent is extended or adjusted under 35 U.S.C. 154(b) by 0 days.

(21) Appl. No.: 16/552,054

(22) Filed: Aug. 27, 2019

(65) Prior Publication Data

US 2020/0068787 A1 Mar. 5, 2020

Related U.S. Application Data

(62) Division of application No. 15/787,314, filed on Oct. 18, 2017, now Pat. No. 10,470,354.

(51) Int. Cl.
*A01C 3/06* (2006.01)

(52) U.S. Cl.
CPC .................................. *A01C 3/066* (2013.01)

(58) Field of Classification Search
CPC .................................. A01C 3/06; A01C 3/066
USPC ........ 239/667, 672, 674, 675, 677, 679, 680
See application file for complete search history.

(56) References Cited

U.S. PATENT DOCUMENTS

| | | | | |
|---|---|---|---|---|
| 4,078,729 A | * | 3/1978 | Foltz | A01C 3/066 219/202 |
| 4,555,061 A | * | 11/1985 | Linde | A01C 3/063 239/675 |
| 5,795,124 A | * | 8/1998 | Kitten | A01C 3/06 198/550.12 |
| 7,172,137 B2 | * | 2/2007 | Neier | A01C 3/066 239/1 |
| 7,191,965 B2 | * | 3/2007 | Neier | A01C 3/066 239/664 |
| 7,871,024 B2 | * | 1/2011 | Peeters | A01C 3/06 239/667 |
| 9,538,700 B2 | * | 1/2017 | Stevenson | A01C 3/066 |
| 9,751,055 B2 | * | 9/2017 | Tamminga | B01F 7/24 |
| 10,470,354 B2 | * | 11/2019 | Grywacheski | A01C 3/066 |
| 10,538,134 B2 | * | 1/2020 | Grywacheski | A01B 76/00 |
| 2009/0108108 A1 | * | 4/2009 | Bunning | A01C 3/066 239/666 |

(Continued)

*Primary Examiner* — Christopher S Kim
(74) *Attorney, Agent, or Firm* — Ryan W. Dupuis; Ade & Company, Inc.; Kyle R. Satterthwaite

(57) ABSTRACT

A manure spreader implement has a compartment for containing manure, a conveyor for displacing manure in the compartment towards a rear end of the implement, and a rotating beater assembly at the rear end of the implement for spreading the manure outwardly from the rear end of the implement. The implement further includes (i) support brackets for supporting the mounting fasteners of the beater teeth on the auger of the beater assembly in double shear, (ii) auxiliary paddles supported by removable fasteners on the auger of the beater assembly between the auger flighting above and the lower paddles of the auger below, and/or (iii) floor slats on the conveyor which have end portions of reduced internal dimension formed by crimps that allow relative sliding between the floor slats and the mounting bars on the chain of the conveyor.

6 Claims, 9 Drawing Sheets

(56) References Cited

U.S. PATENT DOCUMENTS

| | | | |
|---|---|---|---|
| 2012/0048956 A1* | 3/2012 | Stevenson | A01C 3/066 239/1 |
| 2015/0024888 A1* | 1/2015 | Curfman | A01C 3/06 474/110 |
| 2018/0014458 A1* | 1/2018 | Habeck | A01C 3/06 |
| 2019/0110390 A1* | 4/2019 | Grywacheski | A01C 3/066 |
| 2019/0183035 A1* | 6/2019 | Tamminga | A01C 3/066 |
| 2020/0068786 A1* | 3/2020 | Grywacheski | A01C 3/066 |
| 2020/0068787 A1* | 3/2020 | Westcott | A01C 3/066 |

* cited by examiner

MANURE SPREADER IMPROVEMENTS

This application is a divisional of U.S. parent application Ser. No. 15/787,314, filed Oct. 18, 2017.

FIELD OF THE INVENTION

The present invention relates to a manure spreader implement of the type for connecting to a towing vehicle in which the manure spreader implement has a compartment for containing manure, a conveyor for displacing manure in the compartment towards a rear end of the implement, and a rotating beater assembly at the rear end of the implement for spreading the manure outwardly from the rear end of the implement. More particularly, the present invention relates to a manure spreader implement further comprising (i) support brackets for supporting the mounting fasteners of the beater teeth on the auger of the beater assembly in double shear, (ii) auxiliary paddles supported by removable fasteners on the auger of the beater assembly between the auger flighting above and the lower paddles of the auger below, and/or (iii) floor slats on the conveyor which have end portions of reduced internal dimension formed by crimps that allow relative sliding between the floor slats and the mounting bars on the chain of the conveyor.

BACKGROUND

A typical manure spreader implement includes a frame supported for towing in a forward working direction. A compartment for containing manure includes a conveyor operatively associated therewith for displacing the manure rearwardly towards vertical beaters.

A typical vertical beater includes an auger flight with spikes or paddles bolted thereon to increase the ability of the vertical beater to break up and spread the manure outwardly from the rear end of the implement. These spikes or paddles are typically attached to the auger flight using two bolts in single shear. In some instances, a backing support is welded to the auger flighting. The welded backing is costly to manufacture and is known to deform and come loose due to wear and corrosion. The spike or paddle on the vertical beater manure spreaders are subject to wear and impact from hard or frozen material and other foreign objects in the media. The main purpose of the bolt-on spike or paddle is to break down larger pieces of material and to accelerate the smaller pieces for increased spread width and uniformity. The spikes or paddles and the area of the flighting near the outer mount bolts are subject to high wear rates from material flow. They are also subject to failure or deformation due to impacts of hard objects.

Typical manure spreader implements with vertical beaters configure the vertical beater with a base plate and paddles on the bottom of each beater. The upper portion of the beater is constructed with multiple full rotations of auger flight or flails. Typically, the space between the top of the lower paddles and the bottom the auger do not have elements to move or throw material. This area allows the apron chain to overlap the lower portion of the beaters. In certain types or states of manure the effective distribution is poor with the middle third of the spread containing more than 75% of the spread material, the outer ⅔ of the spread has low concentrations. This causes uneven crop or pasture development. The circular geometry of the beaters results in the areas where large amounts of material fall to the lower discs. These areas are the two-outer edge and the space in front and between the beaters. This high feed rate to the lower discs flood the lower paddles that results in heavy center concentration. For improved spread quality, some manufacturers construct the spreader with only lower spinning discs that consume high power at low discharge rates. Furthermore, the exposed portion of the beater main tube can easily be damaged by rocks and other solid objects.

Numerous manure spreader manufactures construct the conveyor by attaching a floor slat to a chain link using a similar method. This is accomplished by welding multiple pieces together creating a robust joint that allows sliding motion between the chain and slat in a direction that is perpendicular to the chain and in a plane parallel to the main floor as described in U.S. Pat. No. 3,643,786 for example. To reduce chain slat bending a failure the cross section of the slat is increased. The larger cross section slat increases the manufacturing difficulties of creating a joint that allows movement of the chain relative to the slat while maintaining clearance that prevent the slat for separating for the chain during operation. The relative motion is required to allow for tolerance stack up better the chains/slat assembly, tolerances of the drive and driven sprockets shaft assemblies while allowing the slats to be installed and removed without removing the chain from the sprockets. The complex structure to create the joint involves considerable costly and time-consuming welding operations.

SUMMARY OF THE INVENTION

According to one aspect of the invention there is provided a manure spreader implement comprising:

a main frame supported on wheels that roll along the ground in a forward working direction of the implement;

a compartment on the main frame for containing manure therein;

a conveyor assembly extending along a bottom side of the compartment for feeding manure in the compartment rearwardly relative to the main frame towards a rear end of the main frame;

a beater assembly supported on the main frame at the rear end of the main frame to receive manure from the conveyor, the beater assembly including (i) an upright shaft, (ii) a motor acting to drive rotation of the shaft about an upright longitudinal axis of the shaft relative to the main frame, (iii) auger flighting following a helical path along an upper portion of the shaft, and (iv) a plurality of beater teeth coupled to the auger flighting using threaded fasteners at spaced positions relative to one another along the helical path such that each beater tooth projects outward radially of the shaft beyond a peripheral edge of the auger flighting; and a support bracket supporting one of the beater teeth relative to the auger flighting, the support bracket comprising:

a mounting portion releasable fastened to the auger flighting of the beater assembly; and a supporting portion protruding from the mounting portion in engagement along a trailing side of said one beater tooth.

Using a formed plate mounted on the opposite side of the auger flighting relative to the auger tooth adds additional support for the tooth. The tooth can be straight or formed and can be mounted on either side of the flighting to allow for additional clearance between the left and right vertical beaters. This formed plate places the mount bolts in double shear increasing the impact resistance of the attachments and eliminates the need for a welded backing. This formed plate also protects the edge of the auger flight from material flow to reduce wear of the auger edge. The added material of the formed plate acts as a paddle to help accelerate the material for improved spreading.

According to a second aspect of the present invention there is provided a manure spreader implement comprising:

a main frame supported on wheels that roll along the ground in a forward working direction of the implement;

a compartment on the main frame for containing manure therein;

a conveyor assembly extending along a bottom side of the compartment for feeding manure in the compartment rearwardly relative to the main frame towards a rear end of the main frame; and a beater assembly supported on the main frame at the rear end of the main frame to receive manure from the conveyor assembly, the beater assembly including (i) an upright shaft, (ii) a motor acting to drive rotation of the shaft about an upright longitudinal axis of the shaft relative to the main frame, (iii) auger flighting following a helical path along an upper portion of the shaft, (iv) a plurality of beater teeth mounted to the auger flighting at spaced positions relative to one another along the helical path such that each beater tooth projects outward radially of the shaft beyond a peripheral edge of the auger flighting, and (v) at least one lower paddle extending radially outwardly from the shaft at a bottom end of the shaft;

an intermediate paddle assembly comprising:
a mounting collar mounted about the upright shaft at a location spaced axially between the auger flighting thereabove and the lower paddle therebelow so as to be readily removable from the upright shaft; and
at least one intermediate paddle extending outwardly from the mounting collar radially of the upright shaft.

The use of bolt-on intermediate paddle elements between the top of lower paddle assembly and bottom of the auger assembly both protects the intermediate portion of the main tube shaft of the vertical beater, while also contributing to improved spread of manure from the implement. The element tip diameter of the bolt on components is less than the main beater outer element tip diameter. The smaller diameter of the bolt on elements prevent them from contacting the apron drive chain elements. Two halves are constructed to accept various types of elements. These can be paddles or spikes. The main structure of the bolt on elements cover the exposed main beater tube. The bolt on elements grab and project material rearward to about 90 degrees to the direction of spreader travel. These elements reduce the amount of material to the lower paddle assembly preventing them from becoming flooded with material. The bolt on element main structure also add protection to the exposed portion of the beater main tube significantly reducing damage from hard objects.

According to a third aspect of the present invention there is provided a manure spreader implement comprising:

a main frame supported on wheels that roll along the ground in a forward working direction of the implement;

a compartment on the main frame for containing manure therein;

a conveyor assembly extending along a bottom side of the compartment for feeding manure in the compartment rearwardly relative to the main frame towards a rear end of the main frame, the conveyor assembly including (i) a pair of drive chains each forming a respective endless loop, (ii) a plurality of sprockets supported rotatably on the main frame in meshing engagement with the drive chains to support the endless loops at laterally opposing sides of the conveyor assembly, (iii) a plurality of floor slats each extending between opposing ends supported on the drive chains respectively such that an upper run of the floor slats is movable rearwardly along a bottom side of the compartment as the drive chains are rotated, and (iv) a pair of mounting bars associated with each floor slat in which the mounting bars are fixed onto the drive chains respectively to extend inwardly in a lateral direction towards one another so as to be slidably received within the opposing ends of the associated floor slat;

a beater assembly supported on the main frame at the rear end of the main frame to receive manure from the conveyor assembly and spread the manure outwardly and rearwardly from the rear end of the main frame;

each floor slat comprising an elongate tubular body having a pair of end portions at the opposing ends of the floor slat and a central portion between the opposing ends of the floor slat such that the central portion occupies a majority of a length of the floor slat between the opposing ends of the floor slat;

the central portion of each floor slat having a prescribed internal circumference therein which is greater than an outer circumference of the associated mounting bars;

each end portion of each floor slat having a crimp formed therein such that (i) an internal dimension of the end portion is reduced relative to a corresponding internal dimension of the central portion and (ii) movement of the floor slat relative to the mounting bar received therein is limited to a sliding movement in said lateral direction.

Using a crimp formed at the end of each slat to reduce the clearance between the slat and bar stock welded to the chain link eliminates the need for the intermediate pieces and eliminates welding to the slat. Using a formed slat eliminates the intermediate pieces of the slip joint and eliminates significant weld time. The width of the bar stock welded to the chain link will increase. This formed slat reduces the number of pieces and weld time, reducing production cost and weight.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
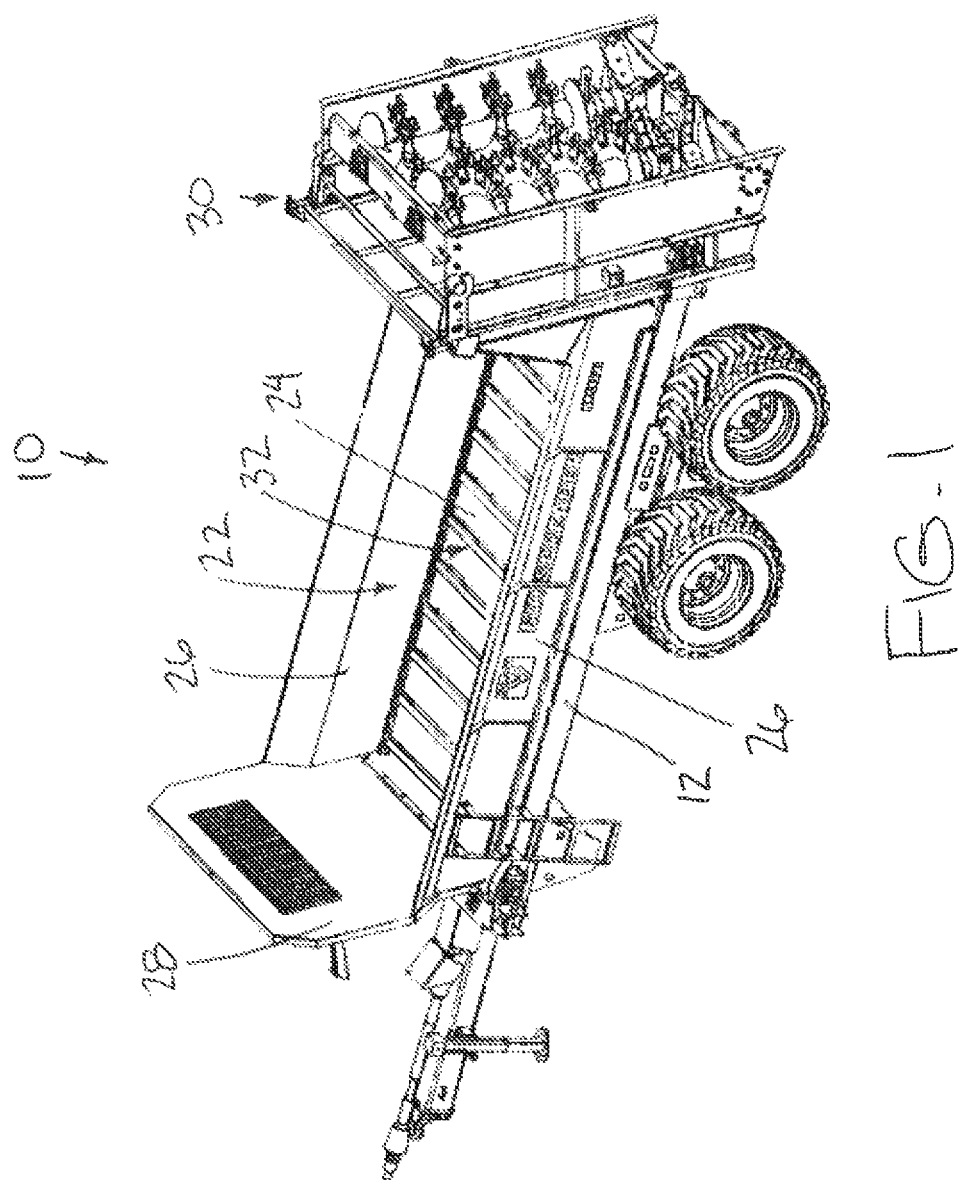
FIG. 1 is a perspective view of the manure spreader implement.
Figure 2:
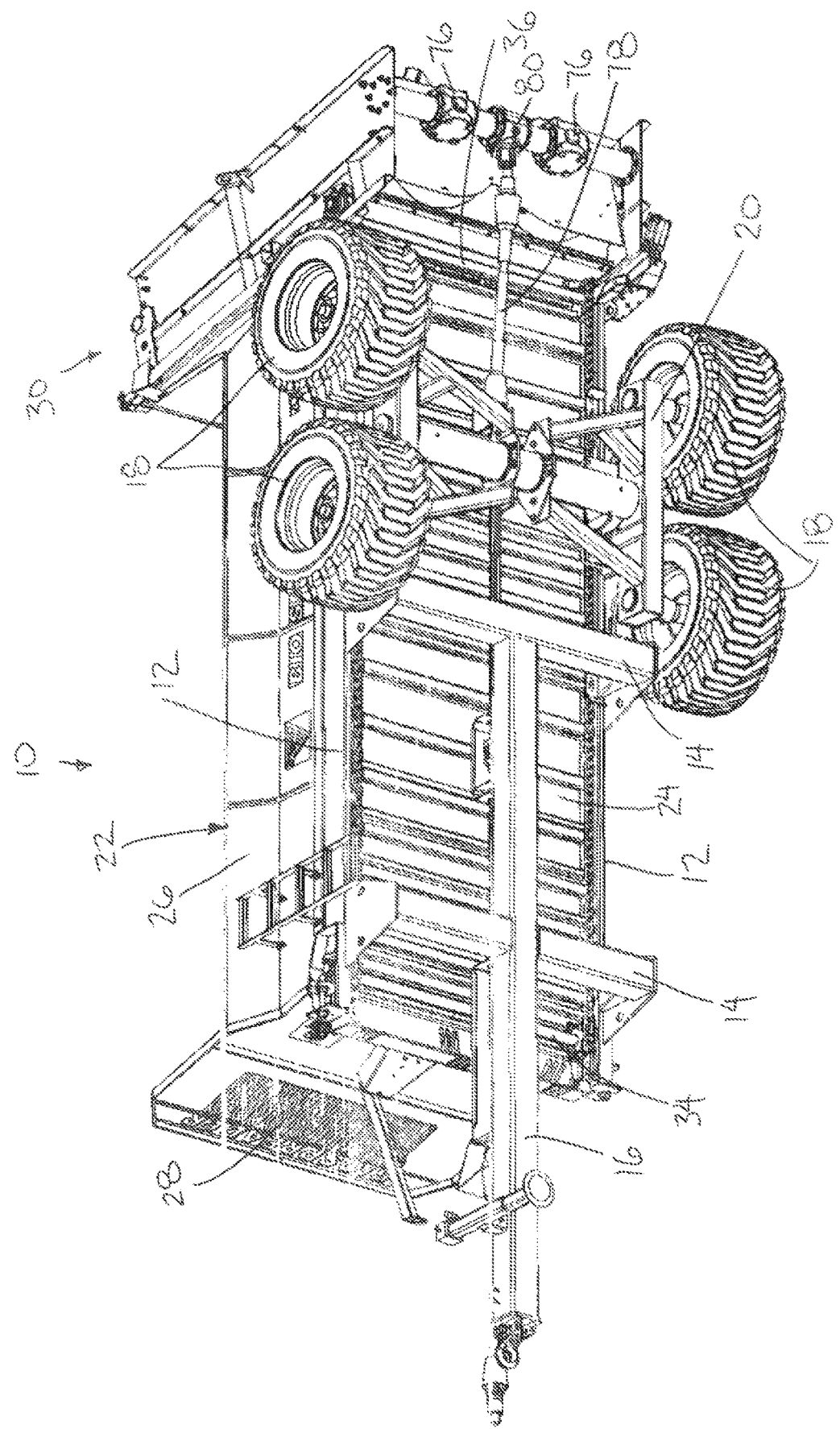
FIG. 2 is another perspective view of the manure spreader implement.
Figure 3:
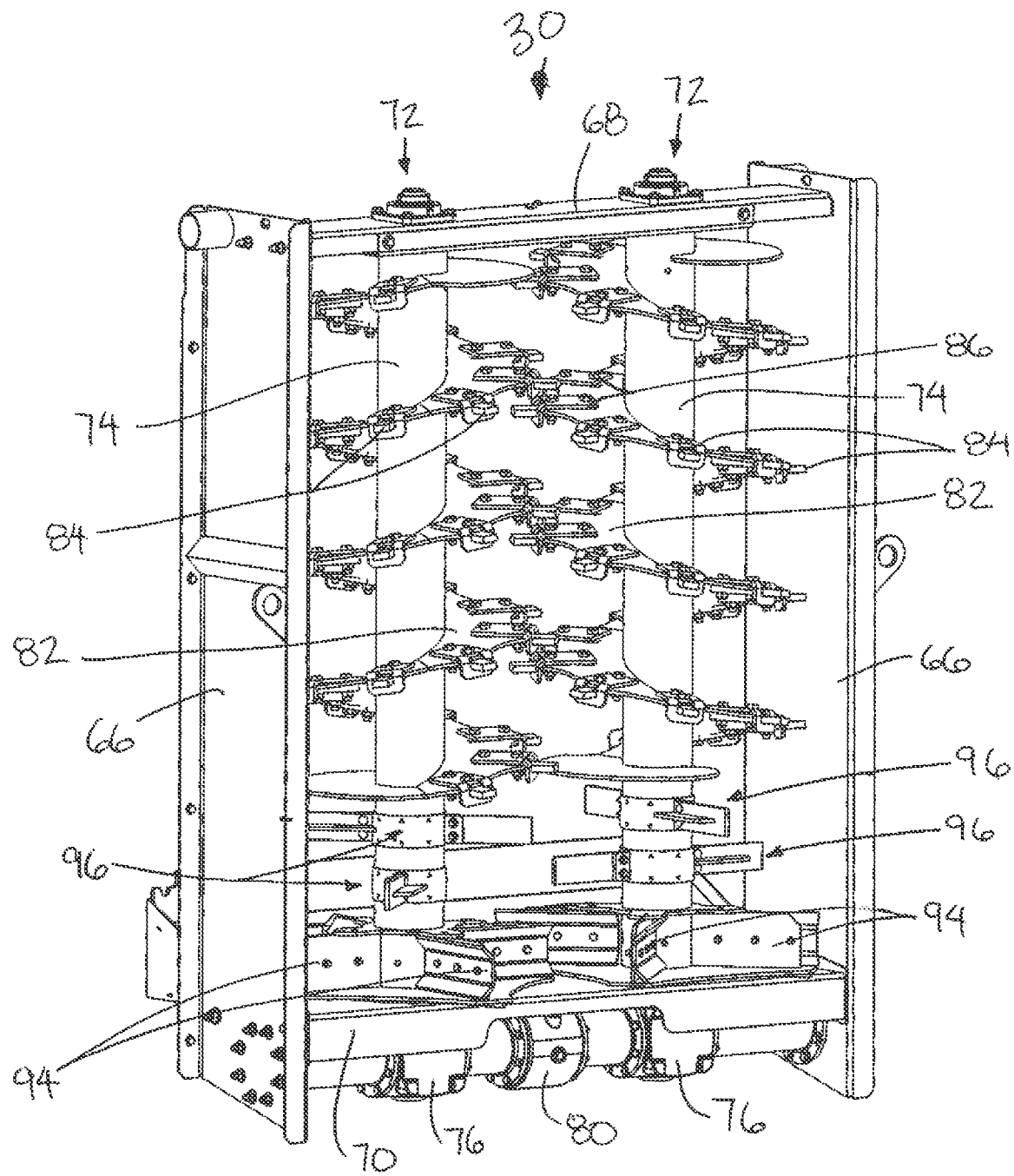
FIG. 3 is a perspective view of the spreader assembly at the rear end of the implement comprised of two vertical beaters.
Figure 4:
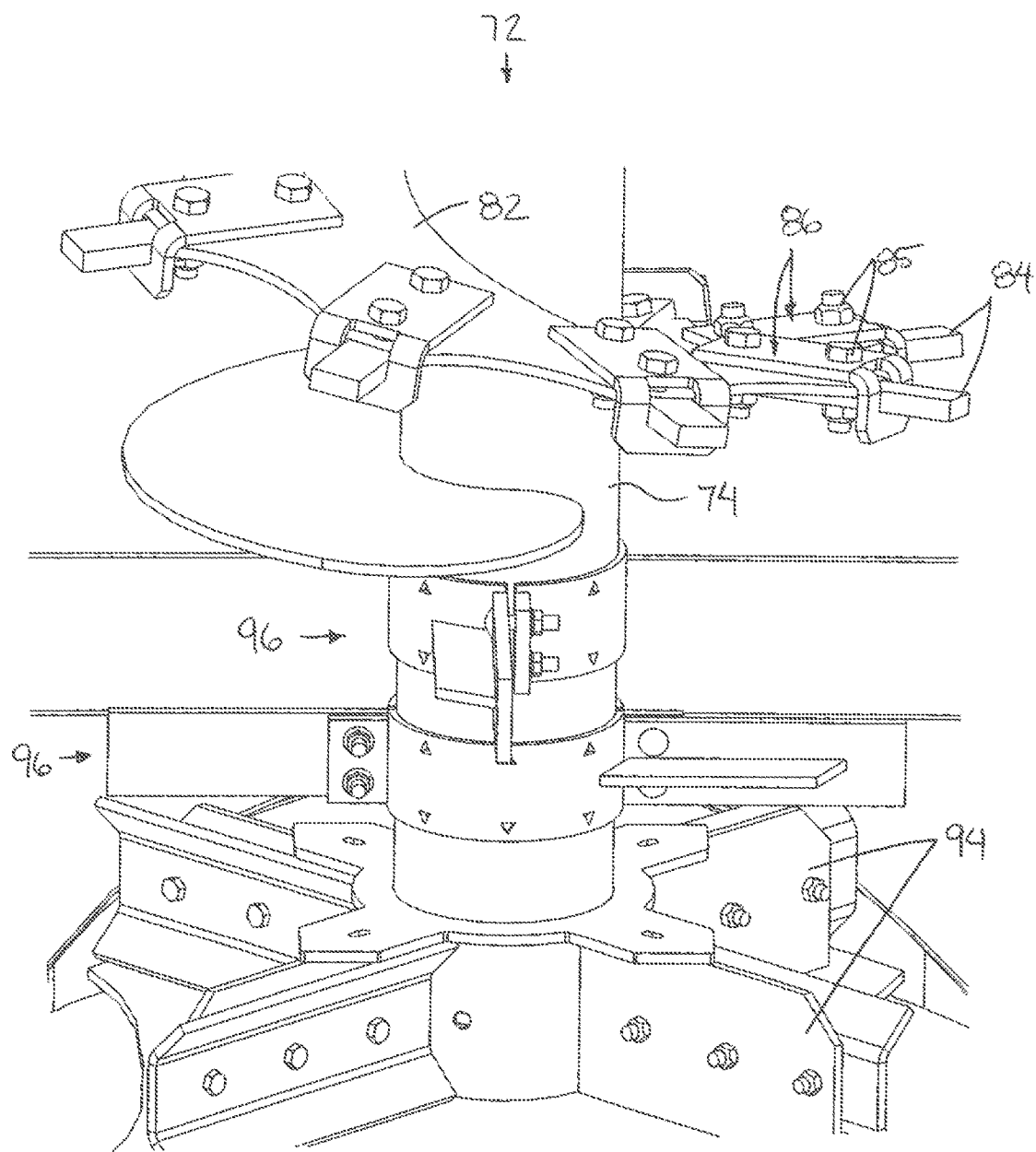
FIG. 4 is an enlarged view of the lower portion of one of the vertical beaters according to FIG. 3.
Figure 5:
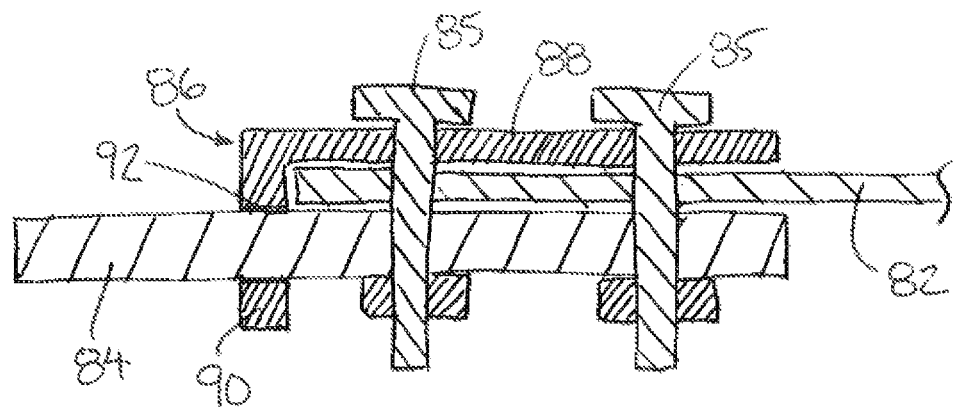
FIG. 5 is a vertical cross-section through both bolts of one of the beater teeth.
Figure 6:
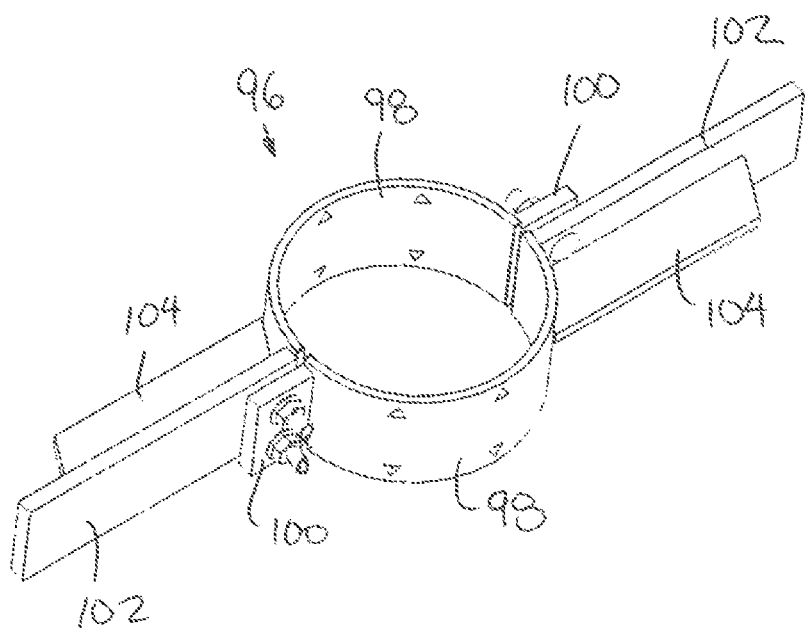
FIG. 6 is a perspective view of one of the intermediate paddle assemblies shown separated from the respective vertical beater.
Figure 7:
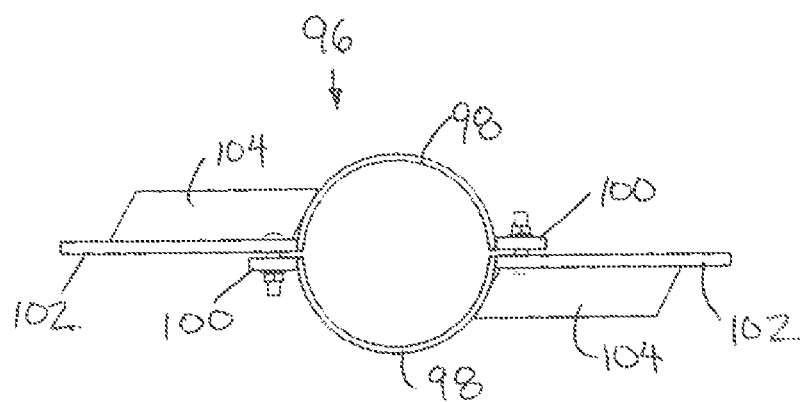
FIG. 7 is a top plan view of the intermediate paddle assembly according to FIG. 6.
Figure 8:
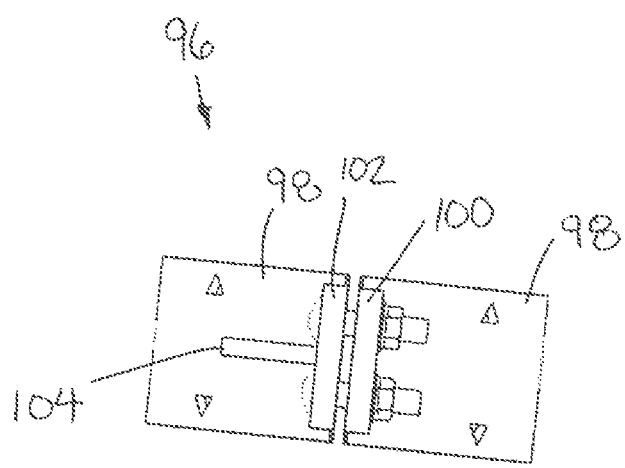
FIG. 8 is a side elevational view of the intermediate paddle assembly according to FIG. 6.
Figure 9:
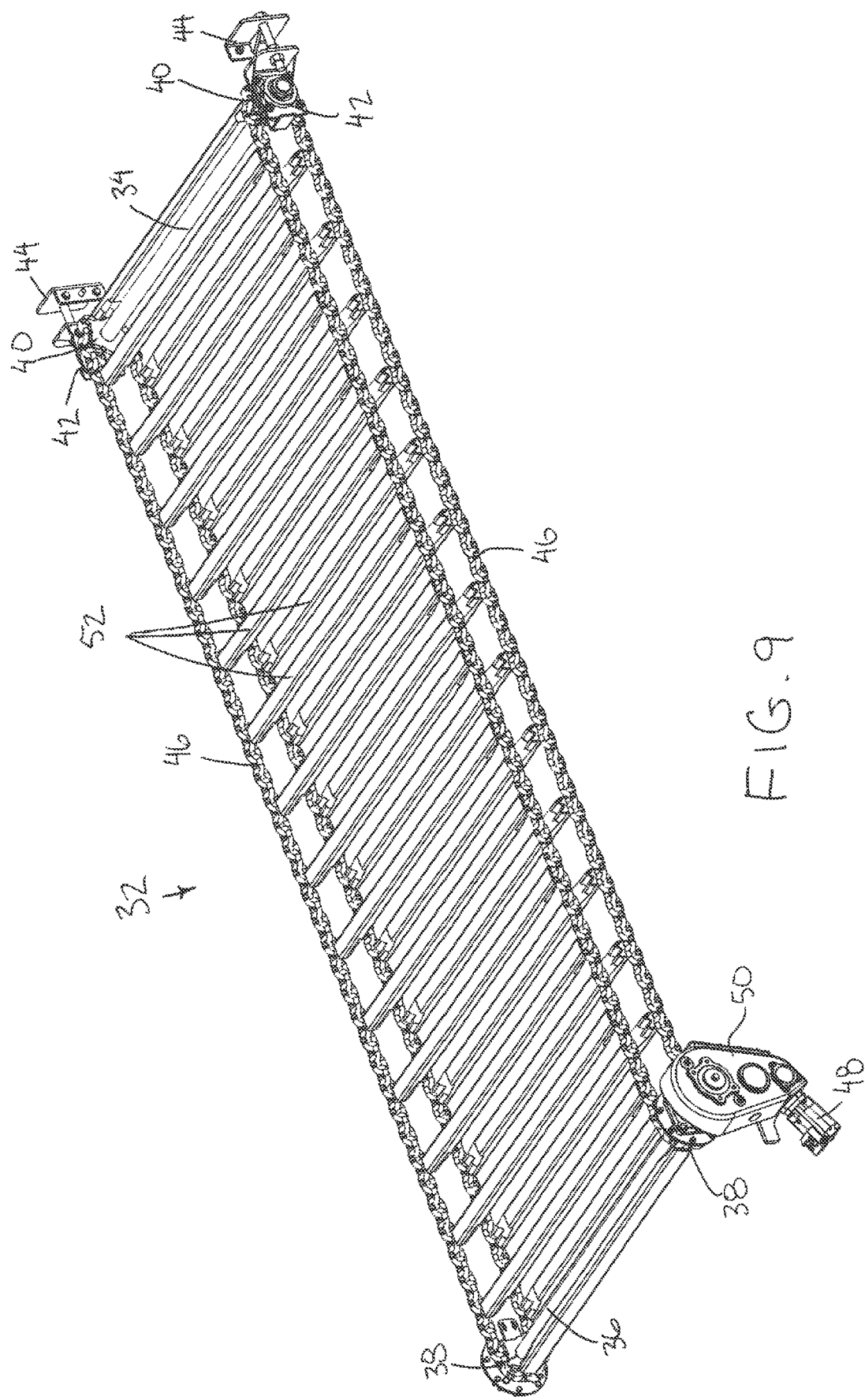
FIG. 9 is a perspective view of the conveyor assembly shown separated from the implement.
Figure 10:
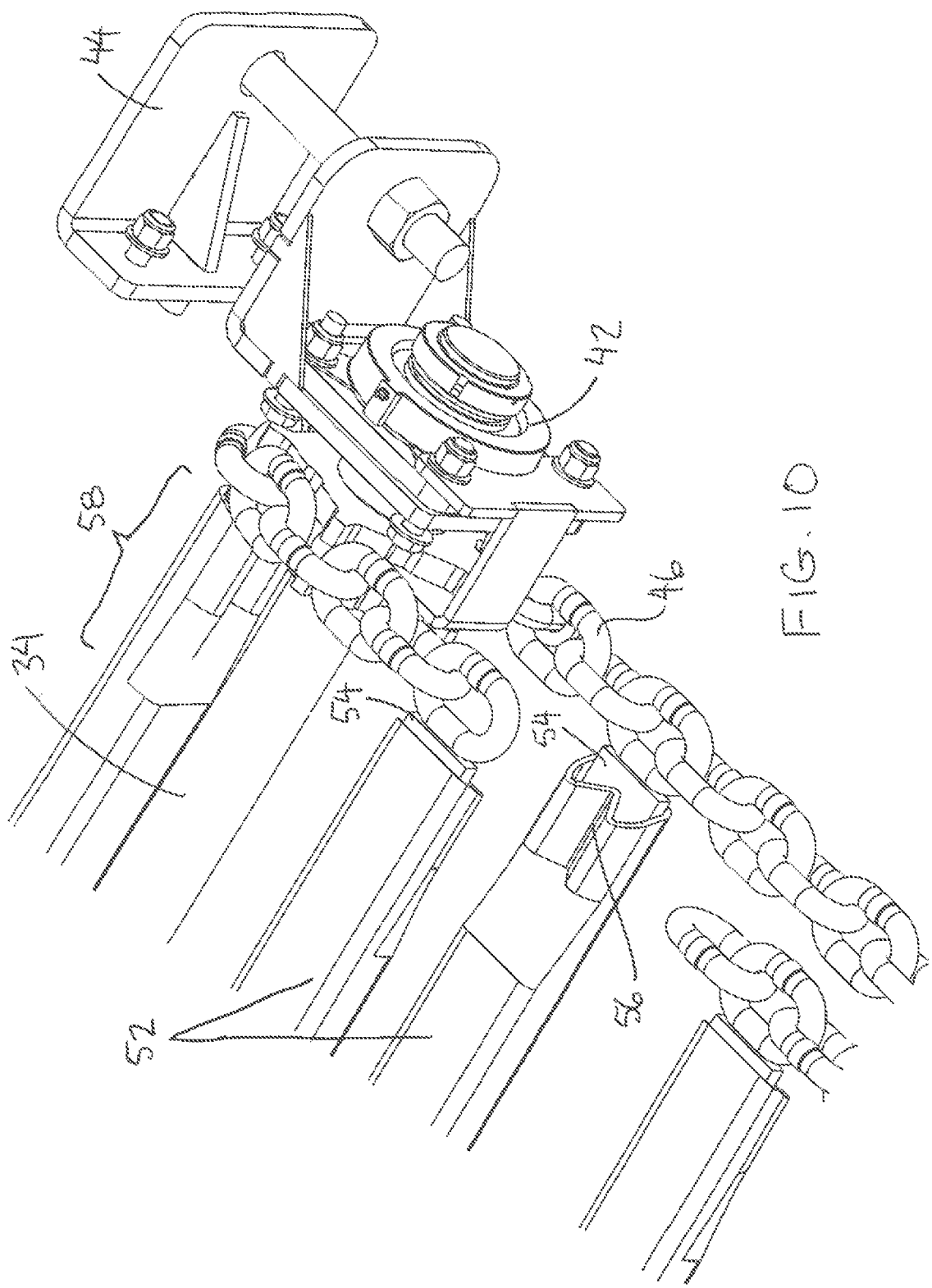
FIG. 10 is an enlarged view of a portion of the conveyor assembly according to FIG. 9.
Figure 11:
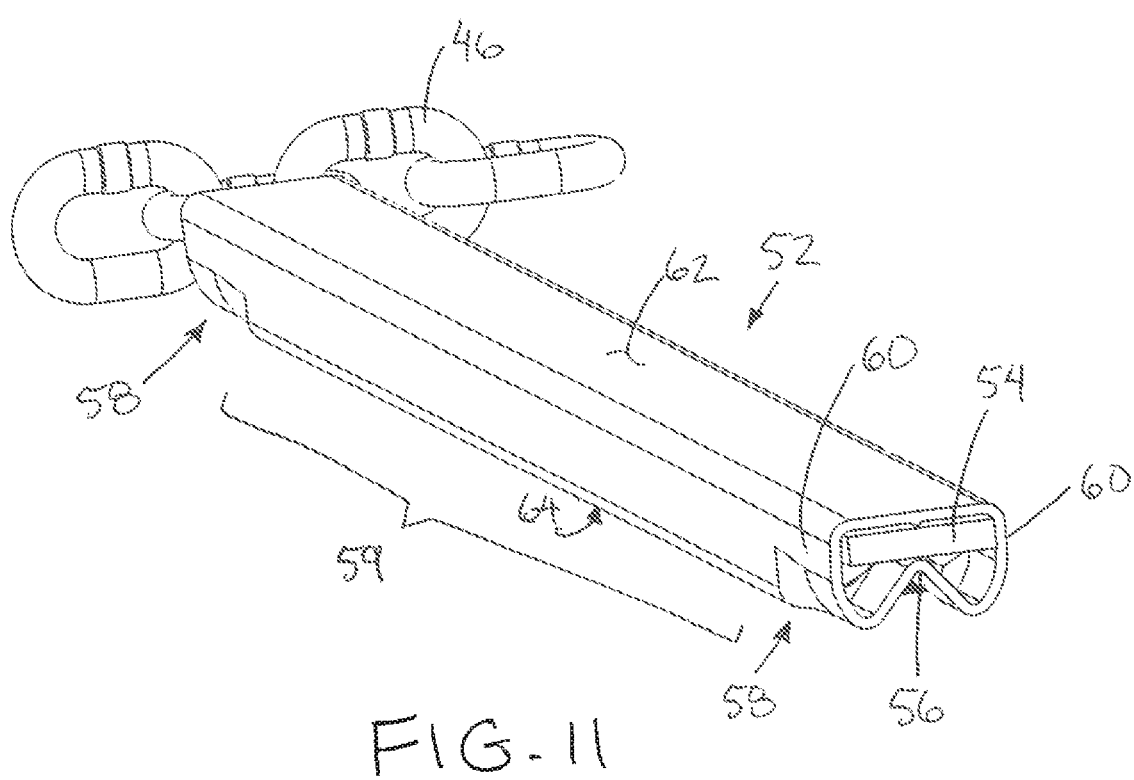
FIG. 11 is a perspective view of one end of one floor slat showing one of the mounting bars received therein.

Referring to the accompanying figures there is illustrated a manure spreader implement generally indicated by reference numeral 10. The implement 10 is intended for use with a towing vehicle, for example an agricultural tractor so that when connected to the towing vehicle, the implement and the tractor move together for rolling movement over a ground surface in a forward working direction.

The implement 10 includes a main frame having two side rails 12 extending in a longitudinal direction of the implement from a front end to a rear end of the implement. A plurality of crossbars 14 extend in a lateral direction between the two side rails at the bottom of the main frame. A hitch arm 16 is connected to the crossbars 14 and extends forwardly beyond the front end of the side rails to support a hitch connector at the forward end thereof for forming the towing connection to the towing vehicle.

The main frame is supported on a set of wheels 18 including two wheels at opposing ends of a walking beam 20 supported at each of the laterally opposed sides of the main frame. Each walking beam is pivotally supported on the main frame at a central location between the respective wheels thereon for pivotal movement about a common walking beam axis of the main frame which is oriented perpendicularly to the forward working direction.

A compartment 22 is supported on the main frame for containing manure therein. The compartment generally includes a floor panel 24 spanning between the side rails 12 of the main frame along most of the length of the main frame between the front and rear ends thereof. Two side walls 26 extend upwardly from the two side rails at the laterally opposing sides of the compartment. A front wall 28 is joined between the front ends of the two side walls 26. The top end of the compartment remains open for loading material therein. A beater assembly 30 occupies a rear end of the compartment for spreading material outwardly from the rear end of the implement frame in operation.

A conveyor assembly 32 is supported along the bottom of the compartment for conveying the material within the compartment rearwardly towards the beater assembly. The conveyor assembly includes an upper run extending longitudinally over the bottom of the compartment above the floor 24 between the front and rear ends thereof. A lower run of the conveyor assembly is received below the floor 24. Slot is defined between the bottom end of the front wall and the floor of the compartment for receiving the conveyor therethrough between the upper and lower runs.

The conveyor assembly is supported on the main frame by a front axle 34 at the front end of the compartment and a rear axle 36 at the rear end of the compartment.

The rear axle 36 is located at the rear end of the compartment rearwardly of the rear edge of the floor so as to lie near a plane of the floor panel. Two rear sprockets 38 are mounted at opposing ends of the rear axle at opposing sides of the implement for rotation together with the rear axle. A bearing housing supports opposing ends of the rear axle rotatably at a fixed location on the main frame.

The front axle 34 is similarly located to be spaced forwardly of the front edge of the floor so as to be near a plane of the floor panel. Two front sprockets 40 are mounted at opposing ends of the front axle at opposing sides of the implement for rotation together with the front axle. A bearing housing rotatably supports each of the opposing ends of the front axle relative to the main frame. Each bearing housing 42 is supported so as to be adjusted in the longitudinal direction of the implement relative to a mounting flange 44 fixed on the main frame using threaded mounts extending in the longitudinal direction. Adjusting the position of the front bearing housings 42 relative to the main frame serves to adjust the longitudinal distance between the front and rear sprockets for in turn adjusting the tension in the conveyor.

The conveyor assembly further includes two drive chains 46 supported at laterally opposing sides of the conveyor. Each drive chain 46 forms an endless loop of a plurality of links connected in series which extend about a respective one of the front sprockets 40 and a respective one of the rear sprockets 38 at one side of the implement frame. The links of the chain are adapted to mesh with the sprockets on the front and rear axles. By driving rotation of one of the axles, the entire conveyor assembly is collectively driven to rotate such that the upper run above the floor of the compartment is displaced rearwardly towards the beater assembly 30 at the rear while the lower run of the conveyor is displaced forwardly below the floor.

A hydraulic orbit motor 48 is mounted on the frame having a rotary output which is coupled by a gearbox 50 to one end of the rear axle for driving rotation of the rear axle in the working direction.

The conveyor assembly further includes a plurality of floor slats 52 connected between the two drive chains at longitudinally spaced apart positions relative to the main frame of the implement so that the floor slats are evenly spaced apart along the bottom side of the compartment in parallel relationship to one another for movement together with the drive chains rearwardly over the floor along the upper run of the conveyor.

Each floor slats 52 is supported by two mounting bars 54 which are fixed at respective outer ends onto respective ones of the links of the two drive chains respectively, for example by welding. Each mounting bar extends laterally inwardly partway towards the opposing mounting bar along a common axis defined in the longitudinal direction of the floor flat. Each mounting bar is generally flat and rectangular in shape to be elongate in the lateral direction of the implement which corresponds to the longitudinal direction of the respective floor slat. The rectangular cross-section of the mounting bar is arranged to be wider in the forward working direction of the implement than the corresponding height of the mounting bar when the mounting bar is located at an intermediate location along the upper or lower runs of the conveyor.

Each floor slat is formed from a single hollow tubular member which defines a unitary body which is continuous and seamless between opposing open ends of the floor slats. The single tube member is crimped at each of the opposing ends to define a crimp 56 at each end of the floor slat corresponding to an end portion 58 of the floor slat. An un-deformed portion of the tube member between the two end portions corresponds to a central portion 59 spanning most of the overall length of the floor slat. The central portion 59 is continuous in profile, corresponding to the original rectangular cross-sectional dimensions of the tube member. More particularly the central portion is defined by two side walls 60 parallel and spaced apart from one another, an upper surface 62 spanning between the two side walls at the top side of the floor slat when the floor slat is located along the upper run, and a lower surface 64 spanning between the two side walls at the bottom side of the floor slats when the floor slats is located along the upper run.

The interior width of the central portion of each slat, that is the width between the two side walls in the longitudinal direction of the implement is approximately equal to the corresponding external width of the mounting bar 54 received therein. The interior height of the central portion of each slat, that is the height between the interior of the upper surface wall and the interior of the lower surface wall, is several times greater than the corresponding height of the respective mounting bar 54 received therein at a location along the upper run of the conveyor.

At each end portion, the crimp 56 is formed at the lower surface wall corresponding to the bottom side of the floor slat when the floor slat is located along the upper run of the conveyor. The crimp thus corresponds to an upward and inward fold in the end portion of the floor slat when located along the upper run. The folded edge formed by the crimped is oriented in the longitudinal direction of the slat corresponding to the lateral direction of the implement. The top side of each end portion and the two side walls of each end portion at the location of the upper run of the conveyor are flush with and in a common plane with the corresponding upper surface wall 62 and the side walls 60 of the central portion of the same floor slat. Accordingly, the internal width between the side walls at each end portion corresponds approximately to the exterior width of the central portion and the mounting bar received within the floor slat. More importantly, the interior height at each end portion of the floor slat which is defined between the inner folded edge at the crimp 56 and the interior of the upper surface wall corresponds approximately to the exterior height of the mounting bar at the location of the upper run of the conveyor. In this manner, when the mounting bars 54 extend inwardly into opposing open ends of the respective floor slat 52 movement between the floor slat and the two mounting bars 54 is restricted to and limited to only sliding movement of the floor slats relative to the mounting bars in the longitudinal direction of the slat and the mounting bars.

The beater assembly 30 at the rear end of the main frame includes a beater frame comprised of two side members 66 which are supported in an upright orientation parallel and spaced apart from one another at laterally opposing sides of the main frame. An upper crossbar 68 is joined between the two side members at a location spaced above the open top of the compartment, and a lower crossbar 70 is joined between the bottom end of the side members at a location which is rearward and outward from the rear end of the conveyor. The beater frame supports two vertical beaters 72 in which each vertical beater comprises an upright shaft 74 spanning between the upper and lower crossbars. The two upright shafts 74 are parallel and laterally spaced apart from one another for rotation about respective upright axes which extend upwardly at a slight forward lean while remaining more vertically oriented than horizontal. Each upright shaft comprises a rigid tube supported by suitable bearings for relative rotation on the upper crossbar 68.

Each upright shaft 74 is operatively connected to a beater gearbox 76 which is supported below the lower crossbar 70. More particularly, the beater gearbox has an output at a top side connected to the bottom end of the upright shaft to drive rotation of the upright shaft and an input at an inner side facing the other beater gearbox. A rigid connecting member is mounted to span laterally between the housing of each beater gearbox and the bottom end of the adjacent side member 66. Similarly, a rigid connecting member is mounted to span laterally between the housing of each beater gearbox and a housing of a center gearbox 80 between the two beater gearboxes 76 to form a continuous rigid structure connected between the bottom ends of the two side members 66.

A power takeoff driveshaft 78 is supported below the main frame to extend longitudinally between (i) a connector at the forward end of the hitch arm for connection to a power takeoff (PTO) of the towing vehicle and (ii) the centre gearbox 80 at the rear end of the main frame between the two beater gearboxes 76. In this manner, a rotation output by the towing vehicle drives the rotation of the driveshaft 78 to input a rotation to the centre gearbox 80. The center gearbox 80 has two laterally opposed outputs which split the driving rotation to the inputs of the two beater gearboxes 76 which drive the two upright shafts.

Each upright shaft includes an upper portion spanning most of the overall length of the shaft between the upper run of the conveyor and the top end of the shaft. An auger fighting 82 is supported helically about the upper portion of each upright shaft such that the flighting is located above the conveyor. The upright shafts are driven to rotate such that the peripheral edge of the auger fighting is displaced rearwardly at the centre between the two upright shafts. The upper shafts are thus supported for counter rotation relative to one another.

A plurality of beater teeth 84 are mounted on the auger flighting at evenly spaced apart positions along the helical path of the auger flighting. Each beater tooth 84 is a rigid bar fastened by radially spaced apart bolts 85 extending through the rigid bar and the auger flighting such that each beater tooth extends generally radially outward from the upright shaft outwardly beyond the peripheral edge of the auger flighting.

A support bracket 86 is associated with each beater tooth 84 to provide additional support for the tooth relative to the auger flighting. The bracket includes a mounting portion 88 formed by a first rectangular plate that is fastened to the auger flighting using the same bolts 85 that fasten the associated beater tooth to the flighting. Each bracket also includes a supporting portion 90 comprising a second rectangular plate joined seamlessly and integrally as a unitary body with the mounting portion 88 at the outer end of the mounting portion so as to be generally L shaped with the mounting portion that is oriented perpendicularly to the supporting portion.

The first plate defining the mounting portion 88 is mounted flat against the surface of the auger flighting directly opposite from the associated tooth 84 in the axial direction of the bolts 85. The bolt holes in the first plate receive the two bolts therethrough. The width of the plate forming the mounting portion in the circumferential direction about the upright shaft is wider than the corresponding beater tooth 84. The plate forming the mounting portion 88 has a length in a radial direction which spans the length of the portion of the tooth 84 which overlaps the auger flighting.

The second plate defining the supporting portion 90 is mounted at the outer end of the mounting portion 88 so as to extend across the peripheral edge of the auger flighting in abutment with the peripheral edge so as to be perpendicular to the radial direction of the beater tooth. An opening 92 in the second plate forming the supporting portion is suitably sized to receive the beater tooth extending radially therethrough. The second plate is aligned relative to the beater tooth such that the perimeter edge about the opening 92 is in snug engagement with the trailing side of the beater tooth to provide support against impacts to the tooth.

As described herein, the support bracket 86 can be quickly mounted in place using the same bolts 85 used to fasten the associated beater tooth 84 to the auger flighting, but the support bracket considerably strengthens the attachment of the tooth to the auger flighting. More particularly, when the beater tooth is impacted during use, the force of the impact is partly taken up by the direct connection of the tooth to the auger flighting along a first shear plane of the two bolts 85, however part of the force is also redistributed through the engagement of the support bracket with the trailing side of the beater tooth towards the mounting portion of the support bracket 86 corresponding to a second shear plane across the bolts that is spaced along the bolts from the first shear plane. The double shear mounting arrangement of the bolt considerably strengthens the attachment of the beater teeth to the auger flighting without adding any complexity to the mounting arrangement of the beater teeth.

The upright shaft of each vertical beater further includes a lower portion adjacent the bottom end of the shaft between the bottom of the conveyor and the bottom end of the shaft in elevation. The lower portion of the shaft includes four lower paddles 94 supported thereon which extend radially outward from the shaft at evenly spaced apart positions in the circumferential direction. Each paddle extends outwardly to a radius which is approximately equal to the radius of the outer end of each beater tooth relative to the axis of the upright shaft. The radius distance between the outer end of each lower paddle and the axis of the upright shaft is slightly greater than half of the distance between the axes of the two upright shafts such that the lower paddles between the two vertical beaters are situated to be misaligned with one another to mesh as the two shafts are counter rotated relative to one another in operation.

Each upright shaft further includes an intermediate shaft portion spanning approximately the height of the conveyor between the lower portion of the shaft below the conveyor and the upper portion of the shaft above the conveyor. The intermediate portion of the shaft supports two intermediate paddle assemblies 96 at axially spaced positions therealong.

Each intermediate paddle assembly 96 comprises a mounting collar formed by two arcuate sections 98 which each extend 180° through part of the circumference about the upright shaft. When the two arcuate sections 98 are joined by circumferential clamping about the upright shaft, the arcuate sections collectively form the mounting collar extending about the full circumference of the shaft.

Each arcuate sections 98 includes a mounting flange 100 formed at one end thereof to extend radially outward in a common plane with the axis of rotation of the shaft. Each mounting collar further includes an intermediate paddle 102 extending radially outward from the opposing end of the arcuate section relative to the respective mounting flange such that the intermediate paddle lies substantially in a common plane with the mounting flange at a location which is diametrically opposite from the mounting flange of the same arcuate section.

When joining the two arcuate sections, a pair of axially spaced bolts extend through cooperating apertures in each mounting flange for alignment with cooperating apertures in the intermediate paddle of the other arcuate section by parallel abutment of each mounting flange against the intermediate paddle of the other arcuate section. Tightening the bolts causes the two arcuate sections to be circumferentially clamped about the upright shaft to fix the paddle assembly relative to the shaft while remaining readily releasable by releasing the threaded bolts. Along each upright shaft, the two intermediate paddles of one paddle assembly 96 are offset 90° from the two intermediate paddles of the other paddle assembly 96 such that each upright shaft supports four intermediate paddles thereon at evenly spaced intervals in the circumferential direction about the shaft.

Additional support is provided to each intermediate paddle by a support plate 104 which is fixed by welding to the trailing side of the paddle. The support plate is centrally located in the axial direction of the shaft relative to the intermediate paddle 102 and is oriented to lie substantially perpendicularly to the axis of rotation as well as the plane of the intermediate paddle. The support plate 104 extends generally radially outward from an inner and fixed to the respective arcuate section of the mounting collar to span most of the length of the paddle in the radial direction. By being fixed to both the arcuate section of the mounting collar and the trailing side of the intermediate paddle, the support plate 104 acts as a gusset to resist deflection of the intermediate paddle relative to the mounting collar.

The radial dimension from the outer edge of the intermediate paddle to the axis of rotation for each intermediate paddle is less than radial dimension from the axis to the outer edge of the beater teeth and less than the radial dimension to the outer edge of the lower paddles. More particularly the radial distance to the outer edge of each intermediate paddle is less than half the distance between the axes of rotation of the two upright shafts. By further ensuring that the radial distance to the outer edge of each intermediate paddle is less than the distance between the axes of the upright shafts and the slats at the rear end of the conveyor, there is no resulting interference between the lower paddles and the conveyor.

Since various modifications can be made in my invention as herein above described, and many apparently widely different embodiments of same made, it is intended that all matter contained in the accompanying specification shall be interpreted as illustrative only and not in a limiting sense.

The invention claimed is:
1. A manure spreader implement comprising:
   a main frame supported on wheels that roll along the ground in a forward working direction of the implement;
   a compartment on the main frame for containing manure therein;
   a conveyor assembly extending along a bottom side of the compartment for feeding manure in the compartment rearwardly relative to the main frame towards a rear end of the main frame, the conveyor assembly including (i) a pair of drive chains each forming a respective endless loop, (ii) a plurality of sprockets supported rotatably on the main frame in meshing engagement with the drive chains to support the endless loops at laterally opposing sides of the conveyor assembly, (iii) a plurality of floor slats each extending between opposing ends supported on the drive chains respectively such that an upper run of the floor slats is movable rearwardly along a bottom side of the compartment as the drive chains are rotated, and (iv) a pair of mounting bars associated with each floor slat in which the mounting bars are fixed onto the drive chains respectively to extend inwardly in a lateral direction towards one another so as to be slidably received within the opposing ends of the associated floor slat;
   a beater assembly supported on the main frame at the rear end of the main frame to receive manure from the conveyor assembly and spread the manure outwardly and rearwardly from the rear end of the main frame;

each floor slat comprising an elongate tubular body having a pair of end portions at the opposing ends of the floor slat and a central portion between the opposing ends of the floor slat such that the central portion occupies a majority of a length of the floor slat between the opposing ends of the floor slat;

the central portion of each floor slat having a prescribed internal circumference therein which is greater than an outer circumference of the associated mounting bars;

each end portion of each floor slat having a crimp formed therein such that (i) an internal dimension of the end portion is reduced relative to a corresponding internal dimension of the central portion and (ii) movement of the floor slat relative to the mounting bar received therein is limited to a sliding movement in said lateral direction.

2. The manure spreading implement according to claim 1 wherein an upper surface of each end portion is continuous with and lies in a common plane with an upper surface of the central portion of each floor slat along an upper run of the conveyor.

3. The manure spreading implement according to claim 1 wherein an upper surface of each end portion spans a full width of an upper surface of the central portion of each floor slat along an upper run of the conveyor.

4. The manure spreading implement according to claim 1 wherein the crimp in each end portion of each slat is formed within a lower surface of the floor slat along an upper run of the conveyor such that the internal dimension of the end portion is reduced in height relative to the internal dimension of the central portion along the upper run of the conveyor.

5. The manure spreading implement according to claim 1 wherein the internal dimension of the end portion is identical in width in a longitudinal direction of the conveyor relative to the internal dimension of the central portion.

6. The manure spreading implement according to claim 1 wherein the end portions and the central portion of each floor slat comprise a continuous hollow tube in which the end portions and the central portion are formed integrally and seamless with one another as a unitary body.

* * * * *